April 30, 1968     L. P. KENMUIR     3,380,090

WATER SLED

Filed May 27, 1966

INVENTOR.
LESTER P. KENMUIR
BY
Francis J. Klempay
ATTORNEY

United States Patent Office 3,380,090
Patented Apr. 30, 1968

3,380,090
WATER SLED
Lester P. Kenmuir, P.O. Box 115,
Salem, Ohio 44460
Filed May 27, 1966, Ser. No. 553,540
2 Claims. (Cl. 9—6)

ABSTRACT OF THE DISCLOSURE

Disclosed in the following specification is a water sled which is intended to be towed behind a powerboat. The hull portion of the sled is preferably formed of a single sheet of thermoplastic material by a vacuum molding process. This hull portion is formed with a V-shaped keel which is deepest toward the front of the sled and tapers upwardly toward the rear, and with a pair of V-shaped fins spaced from the keel at the rear of the sled. A floor, also of thermoplastic material, is sealed to the hull portion creating voids between itself and the keel and between itself and the fins. A mounting bar for securing a towrope is provided at the forward end of the keel and a notch is provided in the forward end of the sled for holding the towrope when it is desired to tow the sled without planing.

---

Figure 1:
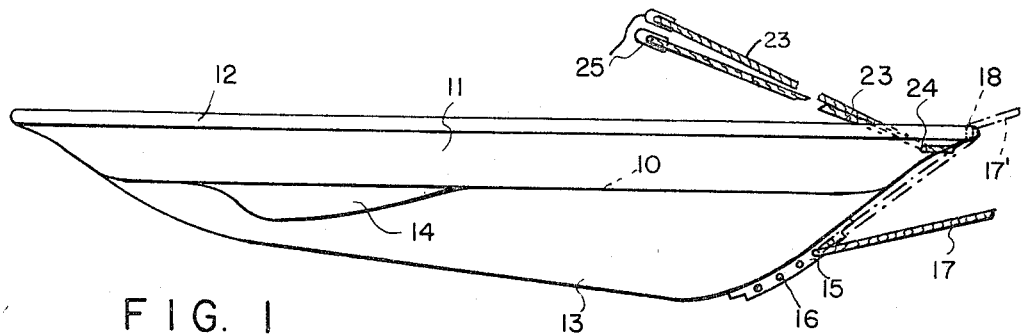

This invention relates to an improved water vehicle of the kind which is intended to be ridden by a sportsman and to be towed behind a powerboat of suitable speed potential. The invention is characterized by novelty in the design and construction of the body of the vehicle and by the method and means by which it may be propelled by the towing vehicle. As regards the first named improvement, the advantages of the invention lies in its low cost of production whereby it may be made available for widespread use, in its utmost safety whereby it is suitable for use by children and/or inexperienced users, and in its configuration and arrangement of lower keel and ribs whereby it possesses improved performance characteristics in actual use behind a speedboat which leaves a sharp and well-defined wake following its progression along the surface of the water.

The above and other objects and advantages of the invention will become apparent upon consideration of the following specification and the accompanying drawings wherein there is disclosed a preferred embodiment of the invention.

Figure 2:
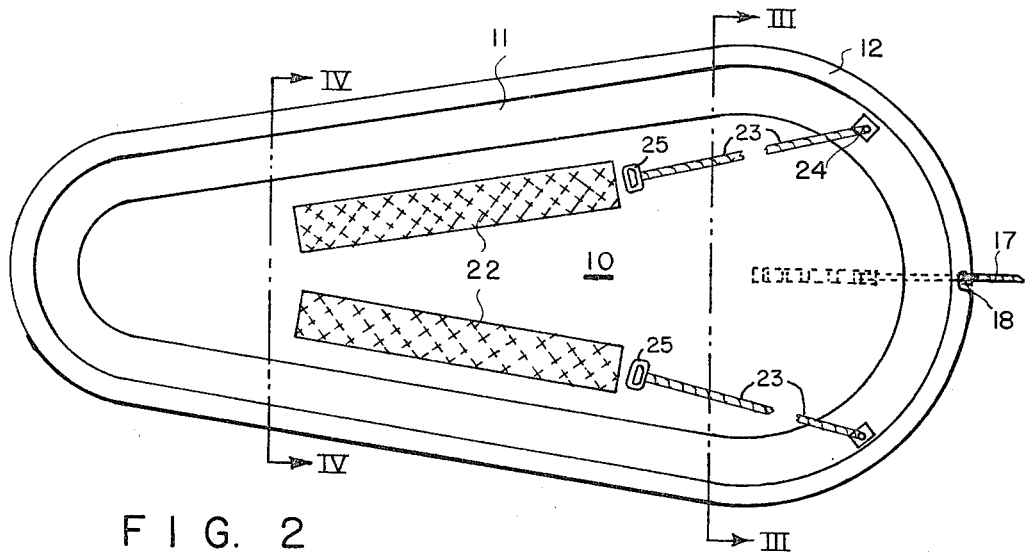
Figure 3:
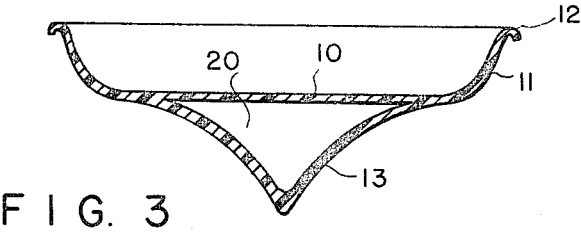
Figure 4:
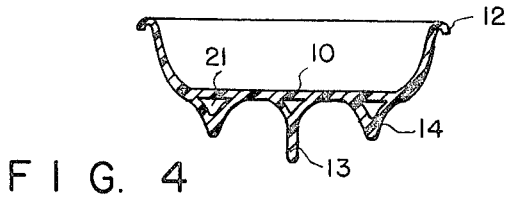

In the drawing:

FIGURES 1 and 2 are a side elevation and a top view, respectively, of a water sled constructed in accordance with the principles of the invention; and FIGURES 3 and 4 are transverse sectional views taken along the lines III—III and IV—IV, respectively, of FIGURE 2.

The general body of the apparatus of this invention is constructed of a homogeneous mass of plastic sheet-like material, which material is preferably of the thermoplastic kind for ease of fabrication, and which mass may, if more convenient, be assembled out of discrete sheets and patches of the sheet-like material—adequate heat being utilized at appropriate spots to homogeneously fuse the sheets and patches into a unitary assembly. Also, the nature of the product of the invention is such that except for the floor 10 shown in the drawing the body structure may readily be formed at low cost and in a single step by the vacuum molding process wherein the undulations of the bottom and side surfaces of the body may be sucked into intimate forming contact with an appropriate mold from a single sheet of thermoplastic material.

Referring now to the drawing more in detail, it will be noted that the floor 10 is generally flat and spans and seals off the inner edge portion of an outwardly extending and upstanding gunwale or rib 11 which has the overall desired outer shape in plan as shown in FIGURE 2 of the drawing. To strengthen the rib 11 and to form a safety upper edge thereon, I provide thereon a continuous downwardly curved flange 12.

Formed integrally with the rib 11 and longitudinally central of the assembly is a keel 13 which is deepest toward the front of the sled while becoming shallower toward the rear thereof, all as shown in FIGURE 1. As shown in FIGURES 3 and 4 this keel 13 is V-shaped in transverse cross section, and in use serves most effectively to restrain the yaw of the sled when towed at either high or low speeds. However, it is a fact that when the towing vehicle is traveling at sufficient speed to set up a wake whose outgoing crests have appreciable height and when the sled is riding longitudinally along one or the other of these crests there is a tendency for the sled to slew from side to side, up and down the inclinations of the crests, which makes for rough riding and difficulty of control. In accordance with the principles of this invention, I overcome this difficulty by forming on the bottom of the sled and toward the rear thereof a pair of catamaran ribs 14 equidistantly spaced from and on opposite sides of the tail end portion of the keel 13. This is shown in FIGURES 1 and 4 from where it is also evident that the ribs 14 are also V-shaped in transverse cross section and that the bottom edges of the ribs 14 slope downwardly in a rearward direction from a point substantially midway between the front and back ends of the assembly. At high speeds it has been noted that one or the other of the ribs 14 will bite into the top of the particular wake crest being ridden and stabilizes the forward direction of the sled even though the other rib and perhaps the keel is riding down a receding slope of the crest.

For towing the sled I provide a multiple-apertured beam 16 preferably made of rust-resistant metal, and suitably embedded in or otherwise secured to the forward prow of the sled as shown in FIGURE 1. A towrope 17 has its end passed through and secured in one or the other of the apertures in the strip 16 as shown at 15, and in normal use the rope 17 is taut in a straight line from the point 15 to the towing boat or skiff. It will be obvious that with this hitch and particularly at appreciable speed, the front end of the sled will have more tendency to lift out of the water and give a more pronounced planing action to the ride. To compensate for this, for various purposes, particularly at the start of a ride or when children or inexperienced riders are to use the device, I provide a hook 18 in the forward extremity of the flange 12 so that the towrope may be looped therethrough and assume an upper position 17′ in its path to the towing vehicle. This, of course, lowers the front end of the sled further into the water and assists a rider getting on the sled and also reduces the tendency of any rider from rolling off the back end of the sled, particularly if he is seated in the same and not using the flexible handgrips which will be described below.

It should be observed that the configuration of the keel 13 and its relation to the flat floor 10 providing a void 20 of substantial volume while voids 21 of lesser volume are formed in each of the ribs 14. Since these voids are hermetically sealed in the process of manufacture of the assembly they permanently remain dry and thus add very substantially to the buoyancy of the assembly whose primary buoyancy is provided by the low specific gravity of the plastic structural material used, all as will be readily apparent by those skilled in the art. This total buoyancy makes it virtually impossible to sink the device even when grasped or impressed in the water by a user and thus serves as a most significant safety feature. Also, this total buoyancy permits the rider to slide and pull himself on board in the water which further extends the range of usefulness of the device since once aboard the rider can straighten himself in the sled for subsequent high speed use. Also the arrangement avoids any necessity for the user who may have fallen off the sled to be rescued by coming near the towing boat or skiff with its trailing revolving propeller.

Completing the structure of the water sled of this invention is a pair of longitudinally extending but forwardly splayed step pads 22 which are rigidly mounted on the flat deck 10 and have upper non-skid surfaces, such as embossed rubber strips. Cooperating with these step pads 22 is a pair of handgrips 25 secured to cables 23 suitably fastened to the body structure at cleats 24. It will be understood that the handgrips 25 enables a rider to assume a standing upright position when being propelled along, in the manner of water-skiing, affording the opportunity to turn and bank and perform other maneuvers made possible by the equipment. In starting out and to assist the rider in reaching the standing position, it is ordinarily desirable to have the towrope in the notch 18, which lends more stability to the sled at lower speeds, but once the rider is firmly implanted on the pads 22 and has the ropes 23 taut it is rather a simple maneuver by a quick jerking action to cause the towrope 17 to fall out of the notch 18 after which it assumes a position shown in full lines in FIGURE 1 to heighten the planing action, as above explained, and which is usually more desirable by experienced enthusiasts.

Having thus described my invention what I claim is:

1. A substantially rigid towable water vehicle, comprising: a unitary dished sheet-like member which is elongated in plan with a rounded front and a smaller rounded rear end, which has an uppper gunwale portion substantially continuous around the periphery thereof, said member having a bottom wall formed with an integral and centrally disposed hollow V-shaped keel portion extending substantially throughout the entire longitudinal extent of said member below said gunwale portion, said member also having a pair of transversely spaced but longitudinally extending hollow catamaran fins extending downwardly from said bottom wall on either side of the longitudinal rear portion of said keel; a second sheet-like member forming a flat floor in said first member below said gunwale portion and hermetically sealing off the voids formed by said keel and by said catamaran fins; and means centrally disposed on the outer surface of the front end of said first member and rigidly secured thereto for attaching a towrope whereby said vehicle may be rapidly towed through water by a power-boat, for example.

2. Apparatus according to claim 1 further characterized in that the upper edge of said gunwale portion of said first member is formed with an integral outwardly and downwardly rolled flange, and said flange having a hook-like notch in its forward-most section whereby said towrope may be temporarily secured therein to apply the towing force to the upper edge of said gunwale portion of said first member.

References Cited
UNITED STATES PATENTS

| | | | |
|---|---|---|---|
| 2,417,508 | 3/1947 | Leyde | 9—6 |
| 2,887,978 | 5/1959 | Tritt | 114—66.5 |
| 2,958,875 | 11/1960 | McClain | 9—310 |
| 3,050,751 | 8/1962 | Moon | 9—310 |

MILTON BUCHLER, *Primary Examiner.*

R. A. DORNON, *Assistant Examiner.*